UNITED STATES PATENT OFFICE.

CARL LÖWIG, OF BRESLAU, IN SILESIA, ASSIGNOR TO GUSTAV LOEWIG, OF DRESDEN, AND FRIEDRICH LOEWIG, OF GOLDSCHMIEDEN, GERMANY.

IMPROVEMENT IN MANUFACTURE OF CAUSTIC ALKALIES AND PREPARATIONS OF ALUMINA.

Specification forming part of Letters Patent No. 201,028, dated March 5, 1878; application filed May 31, 1877.

*To all whom it may concern:*

Be it known that I, Prof. Dr. CARL LÖWIG, of Breslau, in Silesia, in the Empire of Germany, have invented an Improved Process for the Manufacture of Caustic Alkali and Preparations of Aluminum; and I do hereby declare that the following is a full, clear, and exact description of the same.

For the production of hydrate of alumina, manufacturing chemists have hitherto prepared aluminate of soda either by the use of cryolite and lime or the employment of bauxite and carbonate of soda. By introducing carbonic-acid gas they precipitated hydrate of alumina from the solution of such aluminate of soda, at the same time obtaining or regaining the soda as carbonate of soda. I now alter this process in such manner that instead of obtaining carbonates of alkalies I obtain caustic alkalies; and to this end I proceed in the following manner:

I heat up to red heat carbonate of soda or potassa, with so much alumina or alumina ore as to present one equivalent of alkali to one equivalent of alumina. In this manner by solution and subsequent lixiviation aluminate of soda is attained which is entirely free of carbonate of alkali. This product I decompose by the addition of a pulpy paste of hydrate of lime, of hydrate of strontia, or of hydrate of magnesia, whereby the aluminates of said earths will be formed as precipitates, the caustic alkali remaining in solution. Three equivalents of the earths to one equivalent of alumina are required for precipitating the entire alumina from the alkaline aluminates.

The solution of the caustic alkali attained I evaporate, (by preference in a vacuum-pan, in order to avoid the absorption of carbonic acid from the atmosphere,) and finally heat the same in an iron caldron, in order to produce the dry hydrate.

If, instead of alumina, alumina ore containing oxide of iron—for instance, bauxite—is made use of, then, because oxide of iron possesses the same power to expel the carbonic acid from carbonates of alkali at red heat, the quantity of the carbonated alkali can be so augmented that such quantity will be equivalent to the total of the alumina and the oxide of iron.

The combination formed of the oxide of iron and the alkali is decomposed on being lixiviated, and the whole of the alkali is obtained as caustic alkali. The residue obtained by lixiviation is oxide of iron, comparatively pure, and fit to be employed for producing caustic alkalies from carbonates of alkali, by treating the carbonated alkalies with the oxide, as above stated, (with the bauxite,) and, by means of lixiviation, obtaining at once the caustic alkali, but every other oxide of iron formed naturally or artificially that will admit of free pulverization can be made use of for the same object.

If, however, cryolite is employed for making caustic soda, it will be merely necessary to add, during manufacturing, so much bauxite that, to three equivalents of soda in formation, three equivalents of alumina and oxide of iron will be present. I, by all means, recommend to work with a surplus of oxide of iron, (as the mixture will not admit of so perfect and intimate an execution on a large scale that some particles of bauxite may not finally fail to effect their influence on the alkalies,) in order to make certain that all the carbonic acid has been expelled in the furnace. Any sort of flame-furnace capable of affording sufficient heat can be employed. The aluminates of earths attained are, by means of water, liberated from the caustic alkali adherent to them; and, for washing, a lixiviation-battery is preferably made use of, consisting of cylindrical iron vessels containing filters at top and bottom.

The materials to be washed are placed between the filters, whereupon diluted lye is forced through the cylinders from below with water to follow. A connection of pipes between the separate cylinders, conducting the fluid issuing from the top of one cylinder into the bottom of the next one, renders a gradual concentration of the lyes possible as well as an economy in the cost of boiling down or concentrating the caustic lye. By hermetically closing the lixiviation-battery the absorption of carbonic acid by the lye is prevented.

I now pass over to the employment of the aluminates of the earths, by means of which the production of a new and important preparation—the gelatinous hydrate of alumina—is attainable in an economical manner.

By way of preparing this alumina from the aluminates of the earths, I suffer them, after having been agitated in much water, to flow slowly into muriatic acid, and after neutralizing the latter I add so much aluminate that the entire alumina of the aluminates applied will be separated.

Hence for dissolving the aluminate, on the whole, six equivalents of muriatic acid are required, (three for the $Al_2O_3$, and three for the base;) and by the subsequent addition of aluminate, two equivalents of alumina and six equivalents of chloride of calcium (or choloride of strontium or chloride of magnesia) are obtained. This sort of separation is easily achieved. It is merely necessary to observe that the same must not take place at a high temperature, because alumina precipitated in a warm state possesses less discoloring or active qualities than when precipitated in a cold state. Hence it is necessary to cool down the solution of the aluminate warmed by reaction before proceeding to separate the alumina. After this process the alumina is washed with water in a suitable apparatus—for instance, in a filter-press—until it is free of the chloride combinations, and finally subjected to considerable pressure.

A solution of chloride of aluminum can, however, also be attained by treating alumina, made red-hot, with muriatic acid under high pressure, from which solution the gelatinous alumina can be separated by the hydrates of the earths, which have previously been stirred to a thin pulp.

In this modification of the process, at least the same quantity of muriatic acid is expended to the alumina gained as in the method described hereinbefore, as three equivalents of muriatic acid are necessary to dissolve one equivalent of alumina, to which must be added three equivalents of the said earths to separate the alumina.

The latter mode of production may, however, be so modified that to two equivalents of alumina only three equivalents of muriatic acid will be consumed, by using the aluminates of the earths instead of the hydrates for precipitation. As the clays mostly contain some iron, it follows that hydrate of alumina obtained from them will also contain iron, unless the latter has been removed by other known processes.

For many objects, as for the manufacture of sugar, this iron will prove perfectly harmless, for which reason there is no objection to the use of these clays. But if alumina free of iron is desired, and such alumina is not to be had, then non-active hydrate of alumina may be dissolved, preferably under high pressure, and the alumina separated from the chloride of aluminum. Finally, it must be remarked that the aluminates of the earths, besides precipitating them from the alkaline aluminates, may also be produced by heating to red-heat alumina, bauxite, or minerals containing alumina silicates together with alkaline earths or their carbonated salts. This mode of production will also be applied as above for the transformation of non-active or freshly-prepared alumina, and may likewise also serve for the production of alumina from bauxite, more particularly from its white varieties, whereby, however, a product containing iron will be obtained, as the removal of the iron from the bauxite would have to take place before the heating process. This manner of obtaining alumina free of iron must be considered as too troublesome.

When employing clay, the alkaline earths act in such manner that one part of the same will be combined with the silica, while the other part will, together with the liberated alumina, form the aluminate.

With the aluminates thus obtained, the production of the gelatinous alumina takes place in the same manner as mentioned above, where the aluminates of the earths are produced with the assistance of the alkalies.

Hence the production of gelatinous alumina can be attained with or without the employment of alkalies from alumina, which is to be subjected to transformation, as well as from bauxite and from clay, and indeed always in several different ways. This variety of modes of manufacturing promises to be a great expedient, for the extensive application safely to be premised, and for furnishing quantities to meet the great consumption of this new article.

What I claim as new, and desire to secure by Letters Patent, is—

1. The production of caustic alkalies from carbonates of alkalies, substantially as hereinbefore described, by heating to a red-heat with alumina or oxide of iron.

2. The simultaneous obtaining of aluminates of lime, strontium, and magnesium, when producing caustic alkalies, substantially as herein specified.

3. The production of the aluminates of barium, strontium, lime, and magnesia, by heating to a red-heat alumina, bauxite, or silicate of alumina with the alkaline earths or their carbonic-acid salts, substantially as herein set forth.

4. The production of gelatinous hydrate of alumina by the formation of chloride of aluminum from the aluminates of the earths prepared according to the herein-described process, or from clay, as herein described, and the decomposition of the same, by means of the earths or their carbonic-acid salts, or the said aluminates, substantially as herein described.

This specification signed by me this 11th day of April, 1877.

PROF. DR. CARL LÖWIG.

Witnesses:
J. EDMUND THODE,
CARL HEINRICH KNOX.